United States Patent [19]
Smith et al.

[11] Patent Number: 5,463,634
[45] Date of Patent: Oct. 31, 1995

[54] DUAL RING FAULT ISOLATION

[75] Inventors: Jay L. Smith; Bradley S. Trubey, both of Raleigh; Anthony D. Walker, Durham, all of N.C.

[73] Assignee: International Business Machines Corporation, Armonk, N.Y.

[21] Appl. No.: 391,303

[22] Filed: Feb. 21, 1995

Related U.S. Application Data

[63] Continuation of Ser. No. 812,773, Dec. 23, 1991, abandoned.

[51] Int. Cl.$^6$ ............................... G06F 11/00; H04J 1/16
[52] U.S. Cl. ......................... 371/20.6; 371/20.1; 370/16; 370/16.1
[58] Field of Search ................................. 371/20.6, 20.1, 371/11.1, 11.2, 68.2; 370/16, 16.1, 15, 13, 85.4, 85.12, 85.15

[56] References Cited

U.S. PATENT DOCUMENTS

| | | | |
|---|---|---|---|
| 4,535,449 | 8/1985 | Arragon | 370/86 |
| 4,566,098 | 1/1986 | Gamnage et al. | 370/89 |
| 4,633,468 | 12/1986 | Skatrud et al. | 371/22 |
| 4,745,597 | 5/1988 | Morgan et al. | 370/87 |
| 4,823,343 | 4/1989 | Takahashi | 371/16 |
| 5,008,663 | 4/1991 | Adams | 370/85.7 |
| 5,117,494 | 5/1992 | Costes et al. | 395/575 |

*Primary Examiner*—Robert W. Beausoliel, Jr.
*Assistant Examiner*—T. Tu
*Attorney, Agent, or Firm*—Joscelyn G. Cockburn

[57] ABSTRACT

Stations on a faulty token ring which includes a control adapter are removed one at a time starting with the most down stream station from the control adapter or of a station up stream from the last station is known to be good all of the stations down stream from that station are removed and the one at a time removal starts with the known good station. The control adapter transmits special beacon frames during the station removal process and when the removal of a station results in receipt of the special beacon frame at the control adapter, the control program identifies a fault domain which includes the station whose removal caused the special beacon to be received at the control adapter and the station immediately up stream from that station. The stations in the fault domain are selectively subjected tests and removed from the ring when a failure is detected.

8 Claims, 14 Drawing Sheets

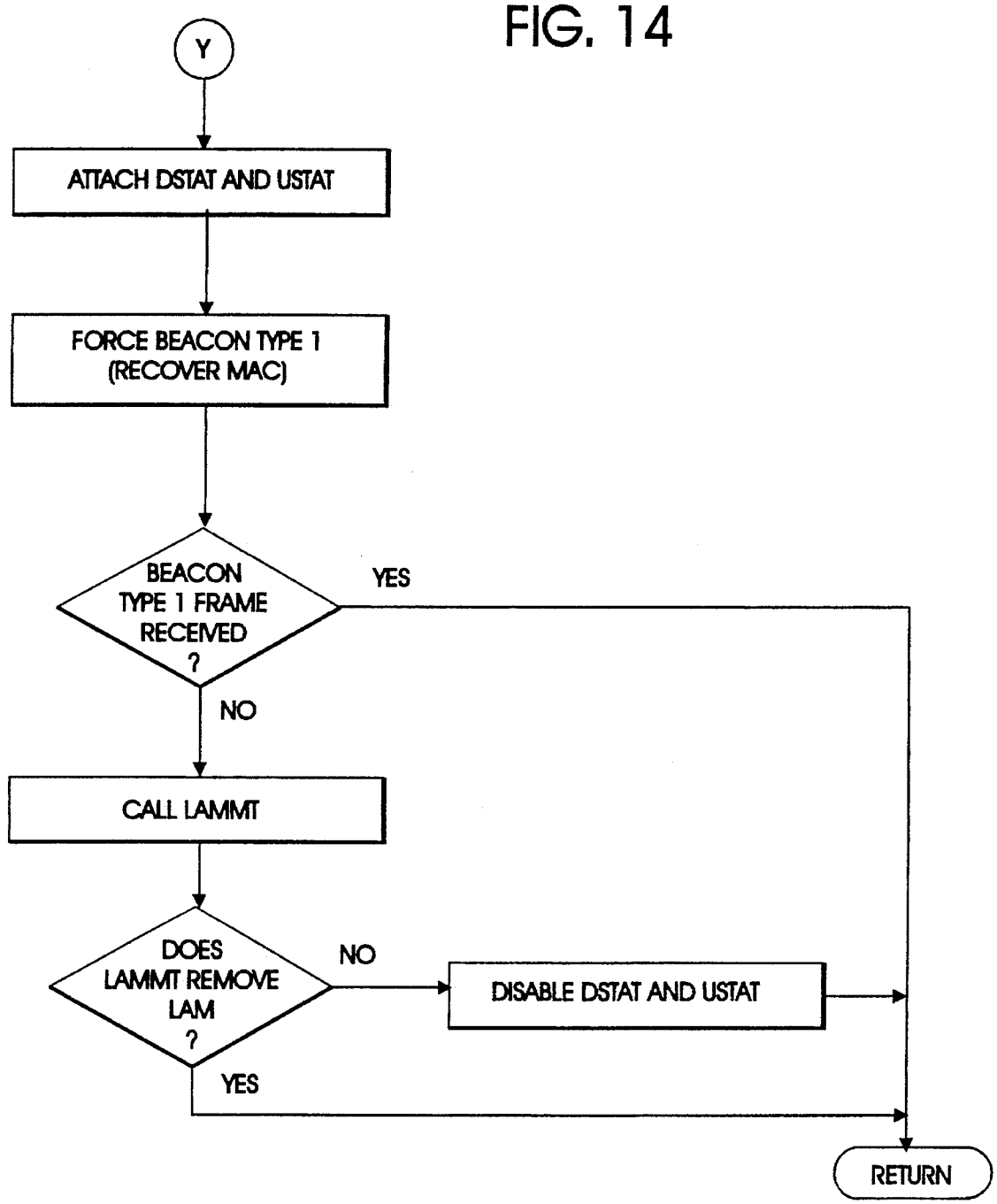

5,463,634

DUAL RING FAULT ISOLATION

This is a continuation of application Ser. No. 07/812,733 filed Dec. 1991, now abandoned.

FIELD OF THE INVENTION

This invention relates to serial communication networks in general and more particularly to a fault isolation and bypass reconfiguration unit for use in a dual ring serial communication network.

BACKGROUND OF THE INVENTION

U.S. patent application Ser. No. 07/631,816 (here in after Application) filed Dec. 20, 1990 and assigned to the same assignee as this application discloses a fault isolation and bypass reconfiguration unit and is incorporated herein by reference. While the fault isolation and bypass techniques disclosed therein are suitable for general use and provide reliable operation, applicants have discovered an improved technique which reduces substantially the time required to isolate and bypass one or more faulty components within an isolated ring. This time reduction provides a significant operational advantage since it substantially reduces additional recovery attempts at higher layers of the communication protocol.

SUMMARY OF THE INVENTION

The invention contemplates a process for detecting, testing and bypassing faulty components in a unidirectional serial token ring communication network which includes a communication adapter under microprocessor control, a plurality of stations and switching means under control of the microprocessor for selectively interconnecting the adapter and the stations in a serial token ring network. When a failure is detected, the microprocessor causes the adapter to transmit a type 1 beacon frame, removes one station at a time from the ring starting at the most down stream station until the type 1 beacon frame is received at the adapter. The station removed before the type 1 frame is received and the next active upstream station are identified as a fault domain. Once the fault domain is identified, all of the stations are removed and each of the stations in the fault domain are individually subjected to one or more tests to identify the failed component in the fault domain.

DESCRIPTION OF THE PREFERRED EMBODIMENT

Figure 1:
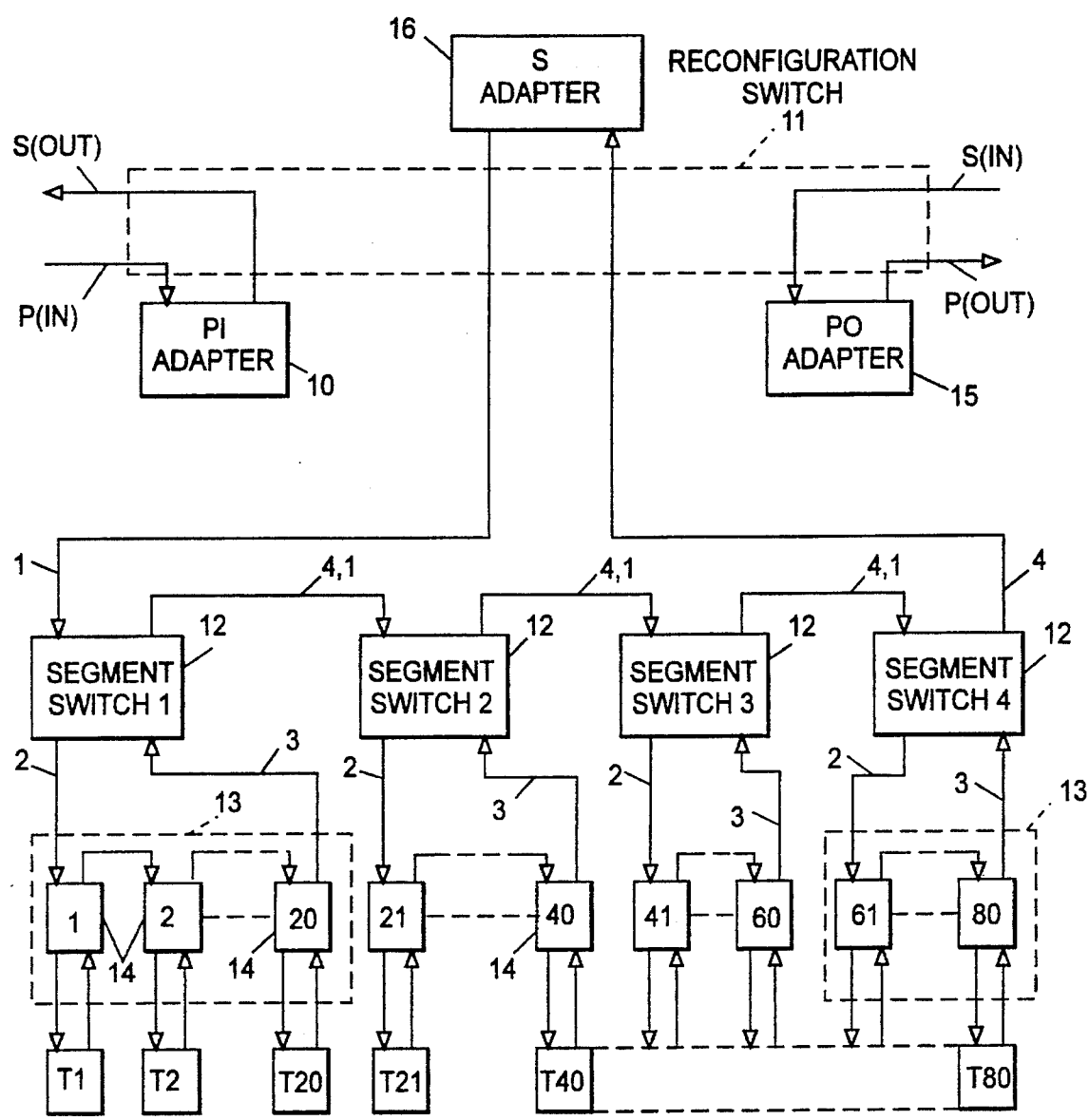
FIG. 1 is a block diagram of an isolated token ring formed from components of a dual token ring network illustrating data flow only.
Figure 2:
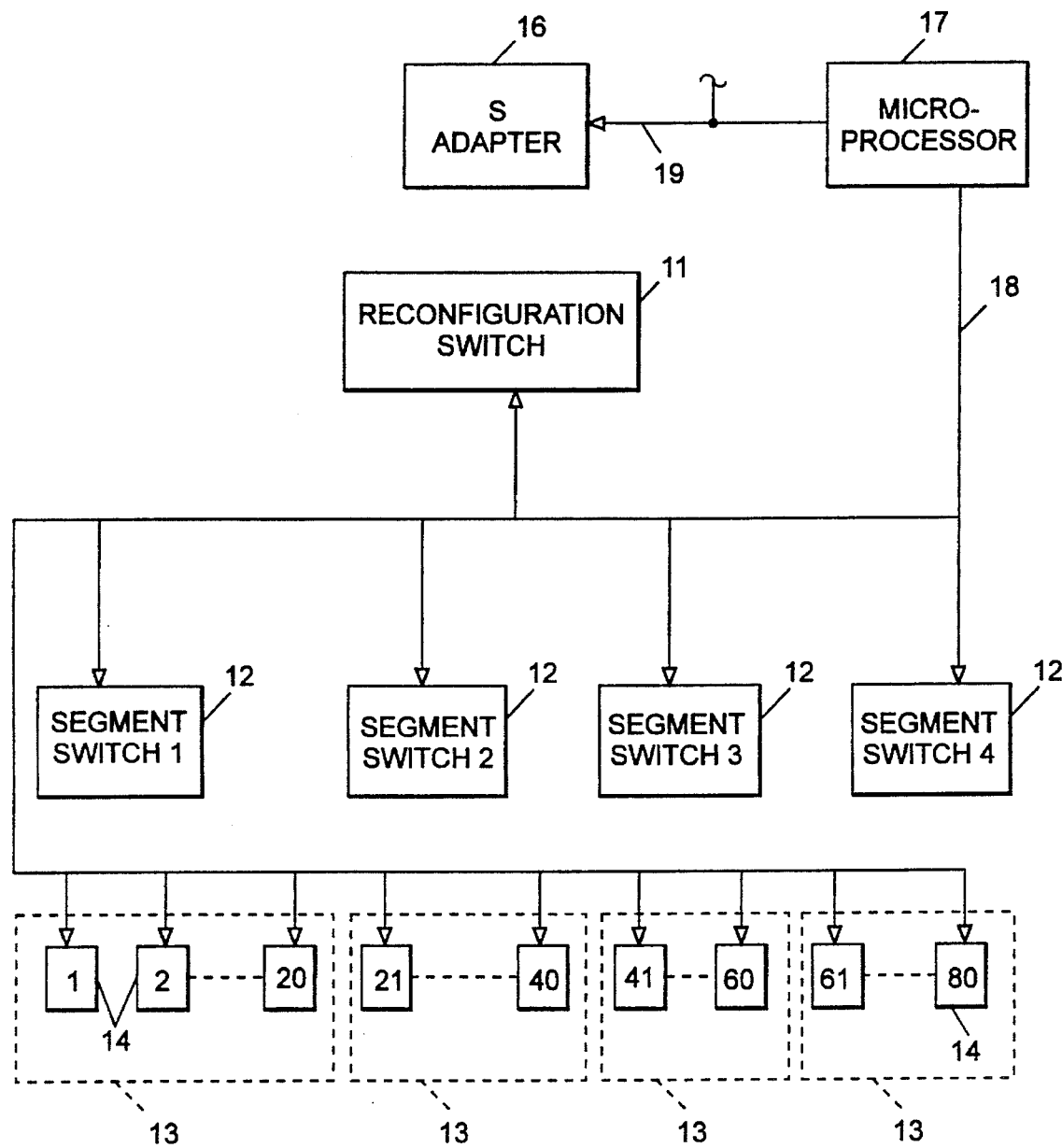
FIG. 2 is a block diagram of the isolated token ring shown in FIG. 1 showing only the control signals.

In the description of FIGS. 1 and 2 which follow, the same reference numerals used in the Application will be used for the same or similar components in this application.

The block diagram illustrated in FIG. 1 is a more detailed drawing of the isolated state of the ring shown in FIG. 4D of the Application. In this state the PI adapter 10 is connected between the primary ring (P) IN and the secondary ring (S) OUT while the PO adapter 15 is connected between the secondary ring (S) IN and the primary ring (P) OUT and the S adapter 16 is included in an isolated ring. This configuration is established by reconfiguration switch 11 under control of the microprocessor 17 via control cable 18 which are illustrated in FIG. 2.

As described in the Application this configuration or state is entered when a fault is indicated to exist between adapters 10 and 15 or between any of the other adapters bracketing the ports. Once this state is entered other devices connected to other reconfiguration units can continue to operate while the microprocessor 17 and the program determine the failed component or components as the case may be. It is incumbent to locate the fault as quickly as possible in order to lessen the impact of the failure on non failing devices connected to the isolated ring. For example, Non failing devices connected to the isolated ring which are engaged in sessions with devices connected to different reconfiguration units will have to reestablish the connection due to time outs of they are not reconnected to the main ring within the time out period. Thus, it is essential that the diagnostic process to pinpoint the source of the fault and bypass it do so as rapidly as possible since the reestablishment of up to a large number (up to 70 or more) of sessions entails substantial overhead and reduces throughput on the network and also impacts the utilization of the connected terminals or stations.

The isolated ring shown in FIG. 1 includes the S adapter 16, the segment switches 12 and the port switches 14. In most instances some of the port switches will be in the bypass state, that is the terminal or station Ti connected thereto will be bypassed, while others will be connected in series circuit to form the isolated ring. The port switches 14 can each include or bypass a single station T in the isolated ring while the segment switches 12 can include or bypass up to twenty active ports. The ports are grouped in modules 13 of twenty ports and each module is connected to one of the segment switches 12.

In FIG. 2 a microprocessor 17 is connected to S adapter 16 by a bus 19. the microprocessor 17 receives and transmits signals to adapter 16 via the bus 19. These communications are described in detail in the Application. A cable 18 is connected between microprocessor 17 and switches 11, 12 and 14 over which microprocessor 17 sends switch control signals.

Figure 3:
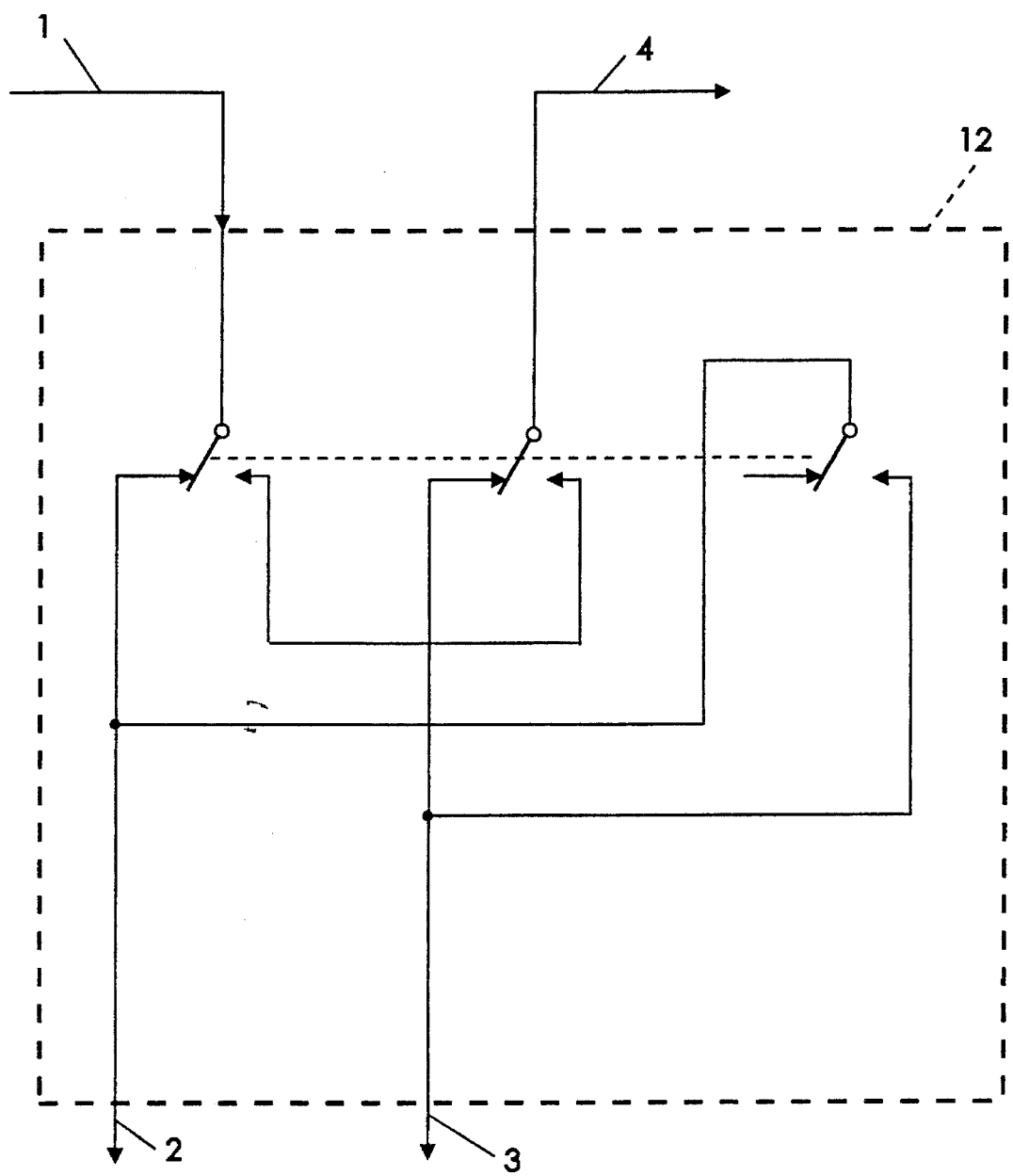
FIG. 3 is a schematic diagram of a segment switch; and, FIGS. 4-14 are flow charts illustrating the control program which in combination with the components illustrated in FIGS. 1-3 detect and bypass faults in the isolated token ring.

The switches 12 are illustrated in detail in FIG. 3. Switch 12 has two states. In the illustrated state condurator 1 is connected to conductor 2 while conductor 3 is connected to conductor 4. In the alternate non-illustrated position conductors 1 and 4 are connected to each other and conductors 2 and 3 are connected to each other. This state is referred to as the wrapped or bypassed state. In this state all of the ports in the port module connected to the segment switch 12 are disconnected from the isolated ring. Port switches 14 are identical to the LAM switches 12. In the alternate position the station output is connected through the switch to its input and the port removed from the isolated ring.

The flow diagrams in FIGS. 4-14 illustrate the program resident in the microprocessor 17 which in conjunction with the igormarion contained in the tables described in the Application locates and bypasses faults that lie within the isolated ring. As soon as the fault is located and bypassed the dual ring is restored and the stations can resume sessions with the other stations on the dual ring. If the time required to accomplish the restoration is short the sessions can be resumed without the need for reestablishment thus providing substantially improved efficiency.

Before proceeding with the description of FIGS. 4–14 it will be helpful to briefly review some of the material covered in great detail in the Application. The IEEE 802.5 token ring standard defines two different beacon signals (type 1 or beacon reconfigure B NR and type 2 or beacon normal YNN). Both of these signals are sent when a failure is detected. The BNN beacon is sent by stations when they discover defined failures. The B NR beacon is issued by the adapters associated with the reconfiguration unit. The application contains a detailed discussion of these signals and how they are used. In addition the Application discloses the generation of tables and information which will be utilized in this application. One of these tables includes the status of the 80 ports. A port can be active or inactive. An active port will be connected in the serial isolated ring circuit and the address of the station connected to the port will be recorded. An inactive port will be bypassed and not included in the serial isolated ring. Inactive ports have no impact on the ring operation since they are switched out.

When an internal fault is detected and the local ports are connected in the isolated ring (typically broken) illustrated in FIG. 1 the recovery procedure is initiated. In this state all of the stations which detect the failure will start to generate BNN, however, down stream stations which receive a good BNN will go into repeat mode and retransmit the good BNN received. Thus, after a settlement time the BNN from the station immediately down stream from the break will be propagated down the good part of the ring. The BNN frames received at the S adapter 16 will be passed over bus 19 to the microprocessor 17. In the mean time S adapter 16 will (under command from microprocessor 17) be sending BNR frames down stream on the ring. Under these conditions, receipt of BNR frames originating from adapter 16 (these frames will have the address of adapter 16 in the from address field) will indicate that the isolated ring is no longer broken.

The recovery procedure begins with the sending of the BNR frames by the adapter 16 and inhibiting inactive ports from entering the isolated ring. This is accomplished by removing the port enabling signal From inactive ports. After a time out of sufficient length to allow B NN frames from the station immediately down stream from the break to arrive at adapter 16 and be passed over bus 19 to microprocessor 17 the process resumes. If a B NN frame is received it will include the address of the station which generated it. Using the port status table the program can determine which port the station is connected to and remove that port and all active ports down stream from that port. If a BNN is not received, then the procedure will start with the last active port which will be removed. If a BNR frame is received at adapter 16 at this time, the ring has recovered without identifying the fault domain. The port to which the beaconing station is connected is restored. If the BNR is still received, all of the active ports are reconnected. If the fault reappears the process is repeated two additional times and a recover retry timer is started to prevent oscillations.

If the above does not result in receipt of the BNR the ports are removed one at a time until a BNR frame is received or aH ports have been removed.

If all ports are removed and the fault is not found then the segment or lobe attachment modules are tested with aH ports or lobes removed. This test involves sending a large number of test frames from the adapter 16 through the LAMs 13. If all but one of the frames return without error then a non-recoverable fault is indicated. If not then aH of the IAAVIs are removed and the frames are sent again to test the adapter 16. If this test passes the LAMs 13 are added one at a time until aH have been tested or one has failed in which case it is flagged as bad and removed.

If the removal of a port causes a BNR frame to be received at adapter 16 and its subsequent addition causes it to disappear, then that port and the next active upstream port define a fault domain which can be subjected to further tests to determine the nature of the failure. Since a fault domain includes two ports it can reside entirely within a single module 13 or it can span two modules. The port status table has all the information necessary to determine which type of fault domain is present. The two ports and the stations connected thereto in the fault domain are labeled DSTAT (downstream station) and USTAT (upstream station).

Each of these stations and the ports to which they are connected are selectively subjected to two single lobe tests SLTA and SLTB under control of one of two program modules (Find Fault W/O LAM Cable or find Fault W LAM Cable). The SLTA (FIG. 10) test involves sending a B NR frame to the selected station and determining if it was returned with the address recognized indicator (ARI) set. If this bit is not set, the station fails to pass the test and the station is removed. If it is set the station passed the test.

The SLTB test (FIG. 11) can be implemented with the station and the LAM or without the LAM. It is enabled by bypassing the station and LAM 13 (see FIG. 3) or the station alone and reconnecting it after a timeout. When reconnected after the timeout, the receipt of a Claim Token frame indicates an error condition. This test attempts to duplicate as closely as possible the normal loading of the station transmitter when connected to a down stream station. This is accomplished by including the receive portion of the lobe of the station under test in the signal path and bypassing the regenerative repeater function in the adapter 16.

Figure 4:
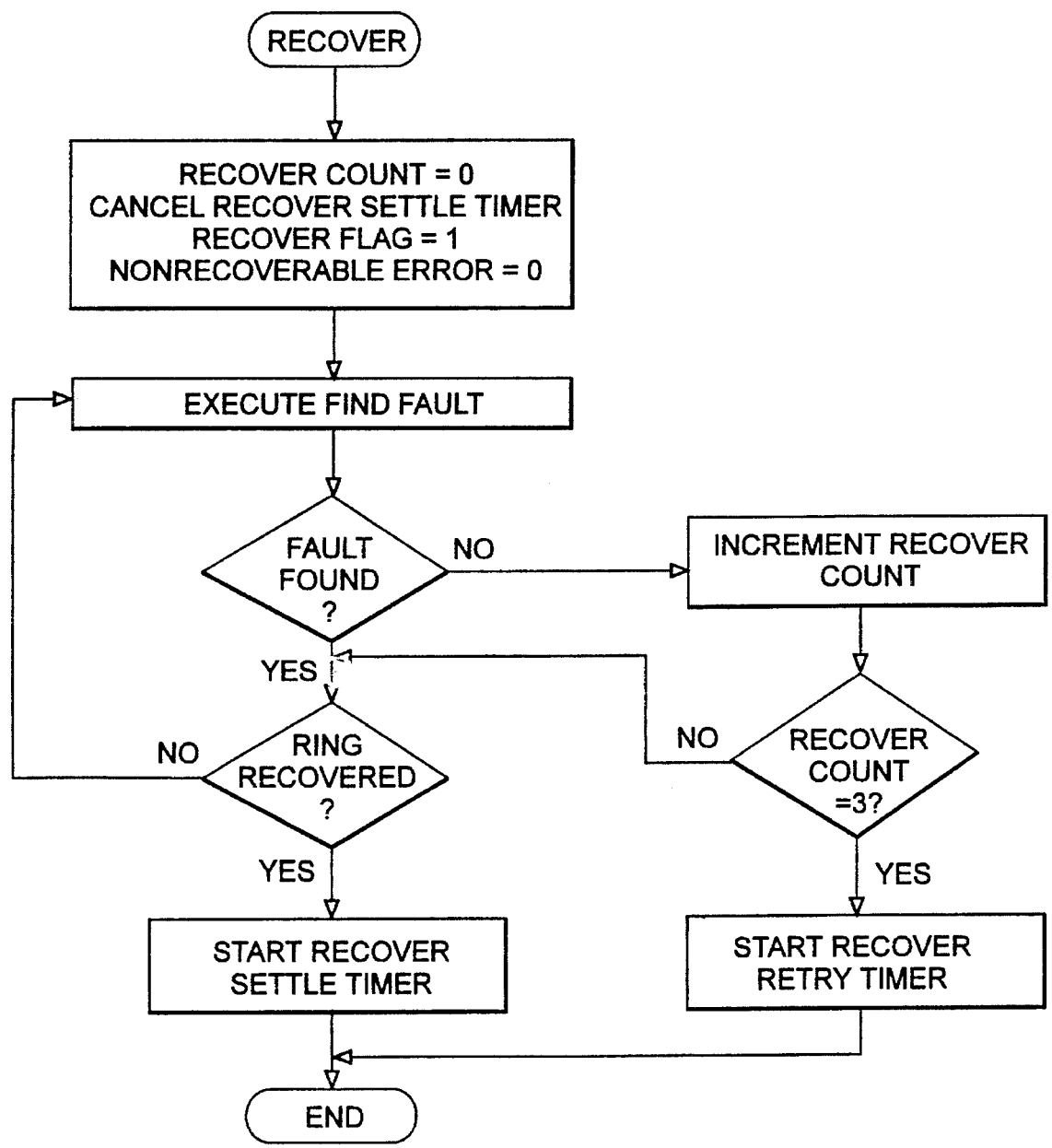
Figure 5:
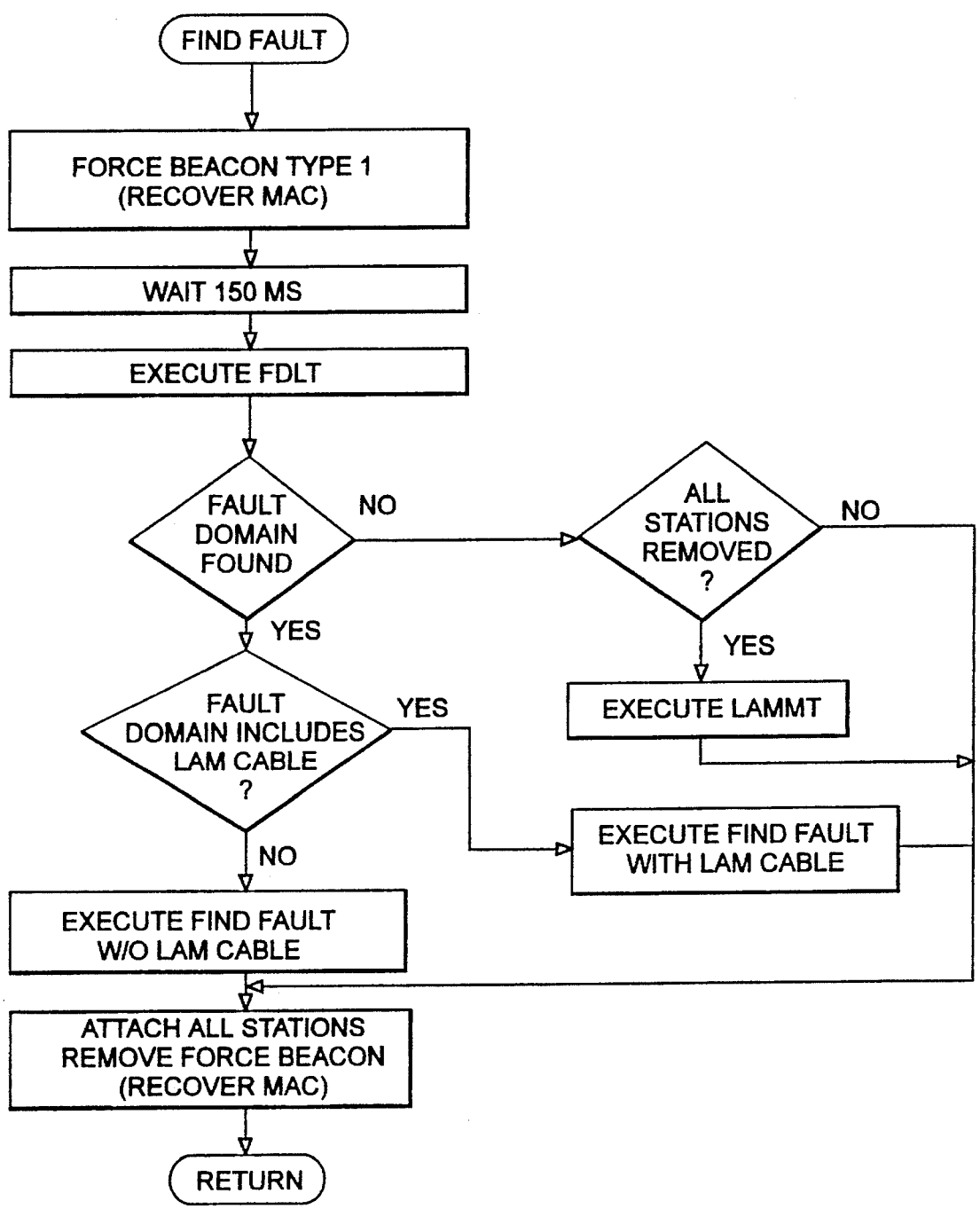

The recovery procedure starts in FIG. 4 where a recover counter is set to zero, the recover settle timer is cancelled, the recover flag is set to 1 and the non-recoverable error flag is set to zero. The program then calls a module Find Fault (FIG. 5). If a fault is not found the recover counter is incremented by one. If it has not reached a count of three and the ring has not recovered the process loops until the count reaches three whereupon a recover retry timer is started. This timer holds off a continuous looping of the process since it will not restart until the timer expires. If the ring recovers a recover settle timer is started and the process ends.

Figure 6:
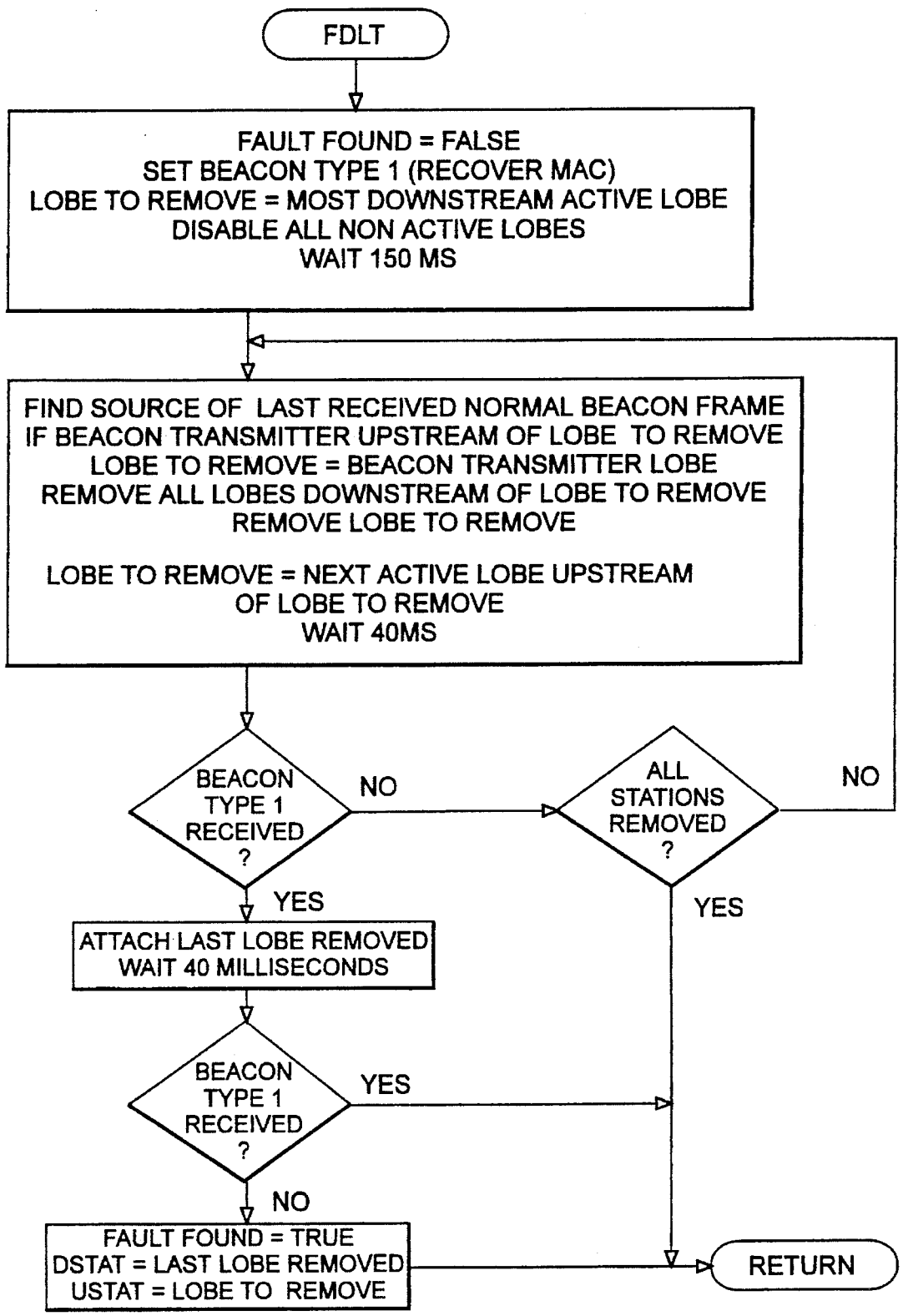
Figure 7:
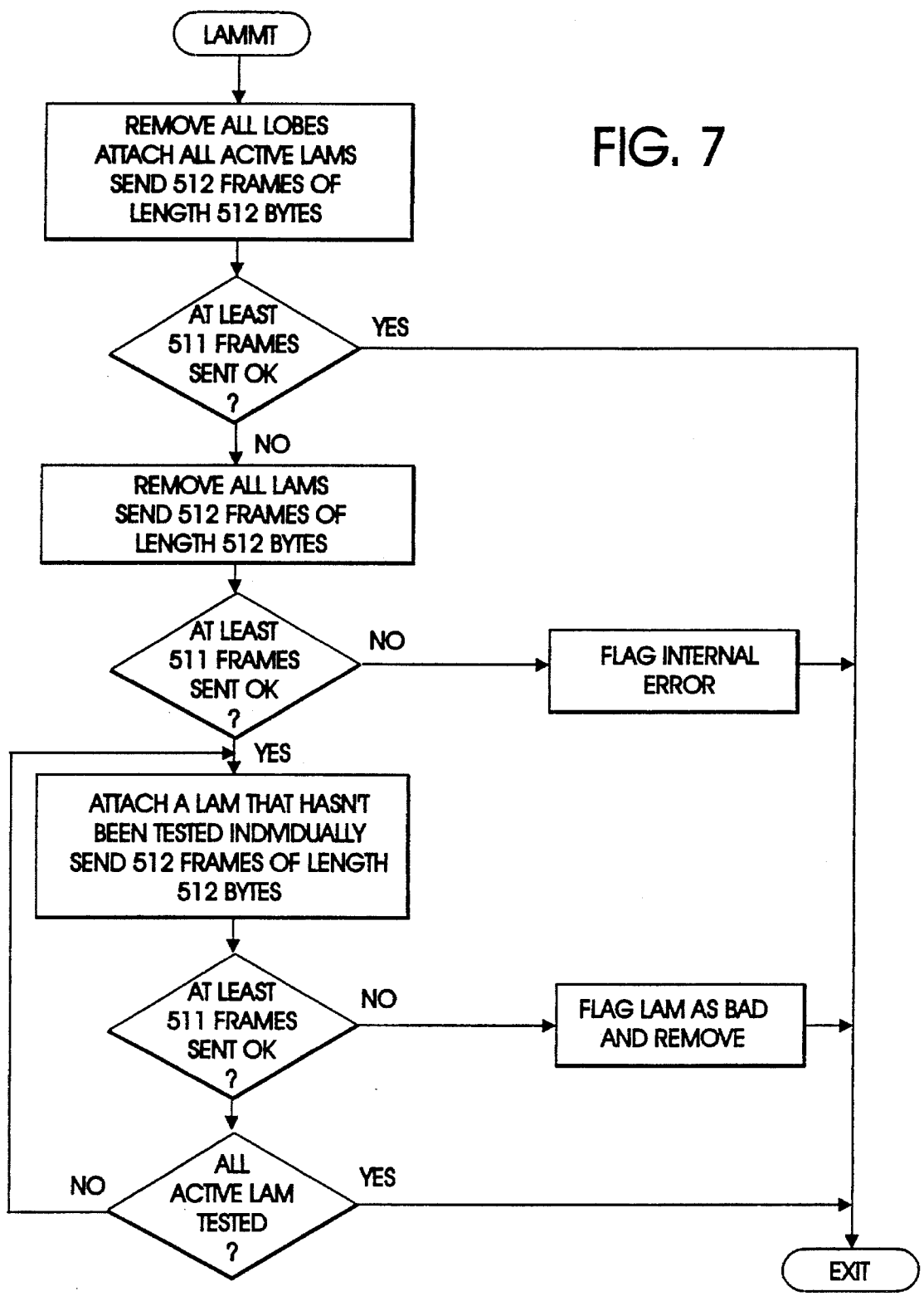

The Find Fault module (FIG. 5) causes adapter 16 to transmit beacon type 1 (BNR) frames and waits 150 ms before calling another module Fault Domain Location Test (FDLT FIG. 6). The FDLT module attempts to isolate the fault to two adjacent active ports and their connected stations (DSTAT and USTAT down/up-stream stations) and sets a fault found flag to true if successful and returns to FIG. 5.

In FIG. 5 the Fault Found Flag is examined. If it was not true, and all of the stations were not removed the program attaches all active stations and removes the forced type 1 beacon from adapter 16 and returns to FIG. 4 and proceeds as previously described. If all of the stations have been removed the program calls a module Lobe Attachment Module Media Test (LAMMT FIG. 7 ) and returns as described above after the LAMMT is executed.

Figure 8:
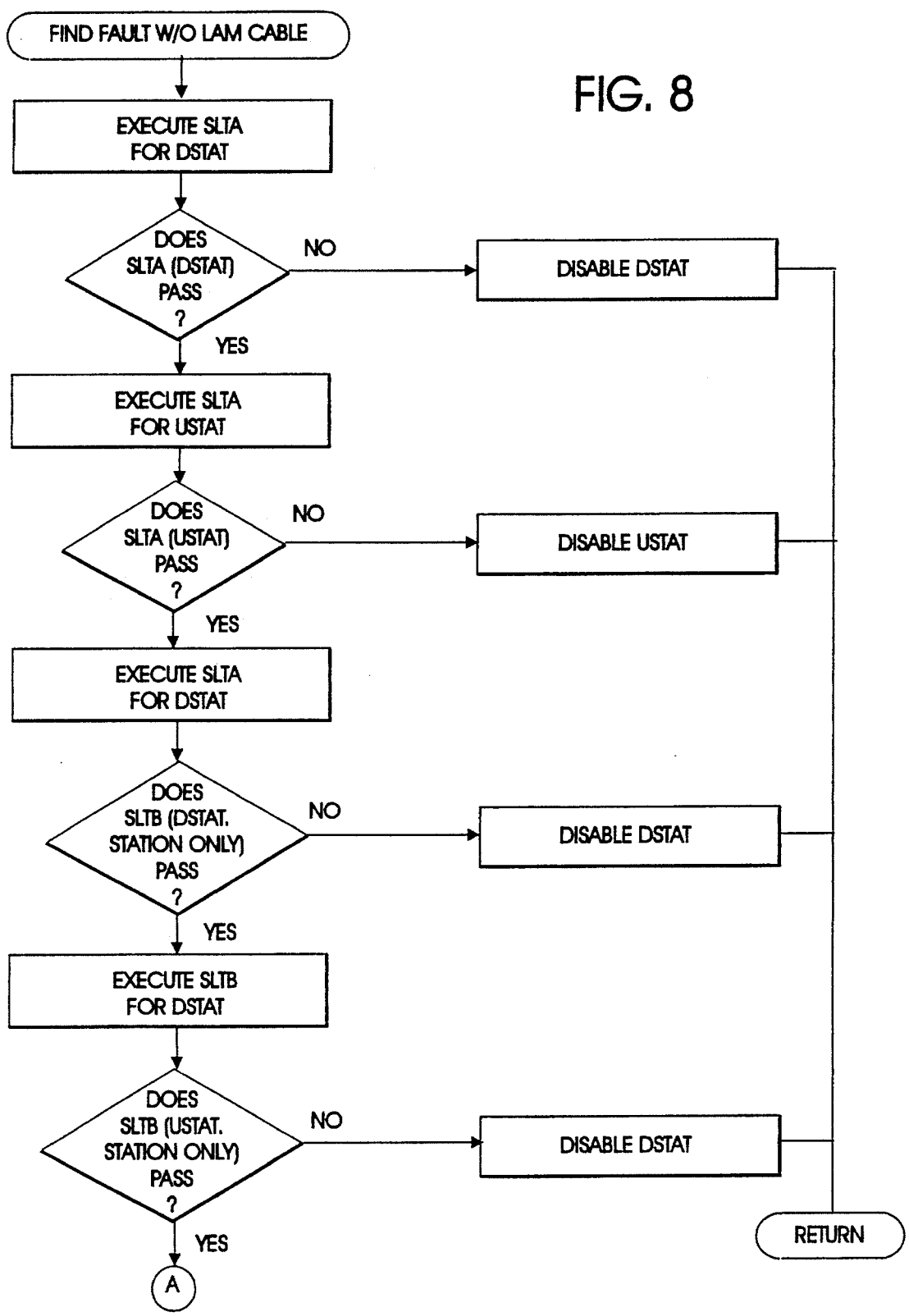
Figure 9:
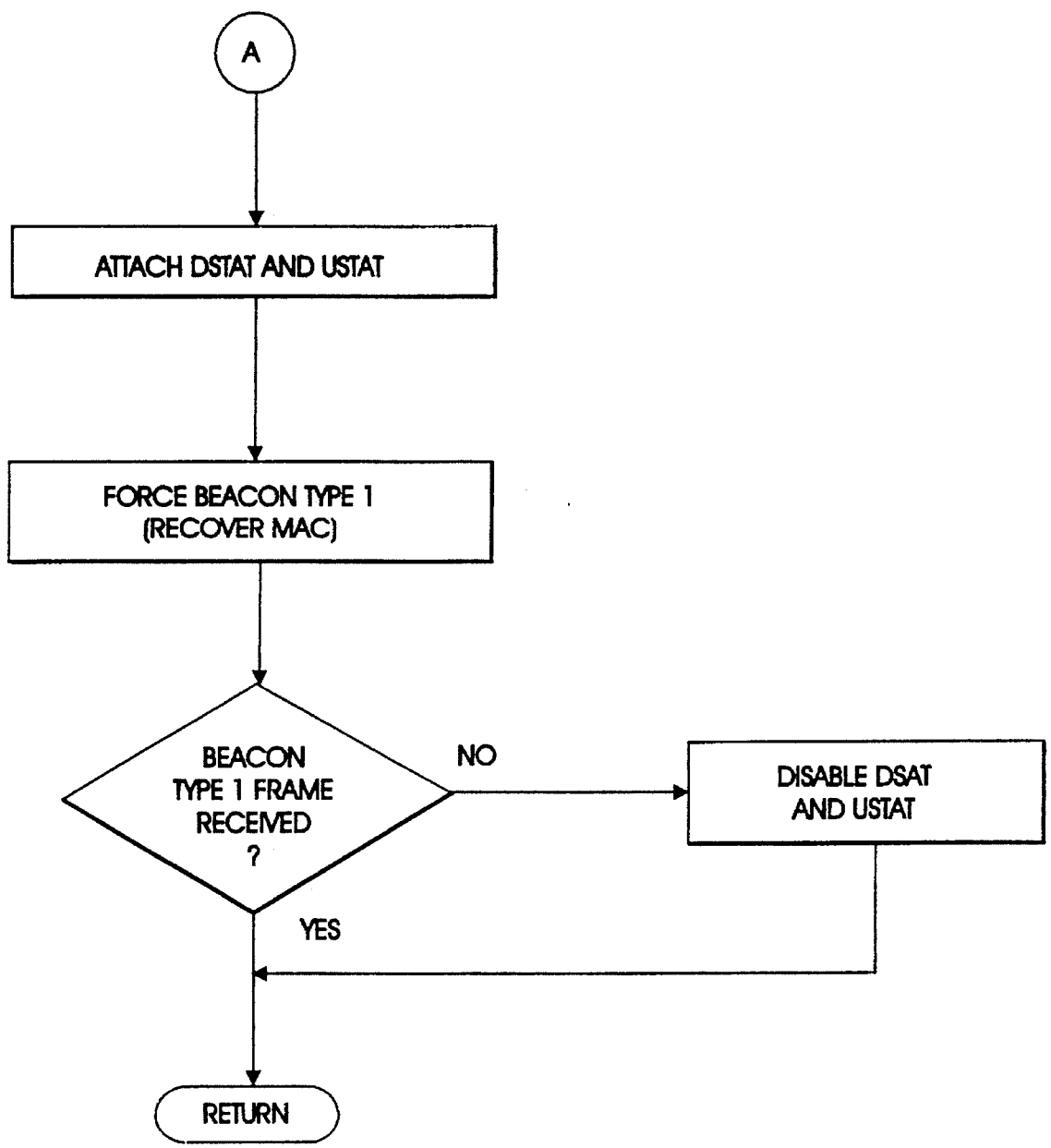
Figure 10:
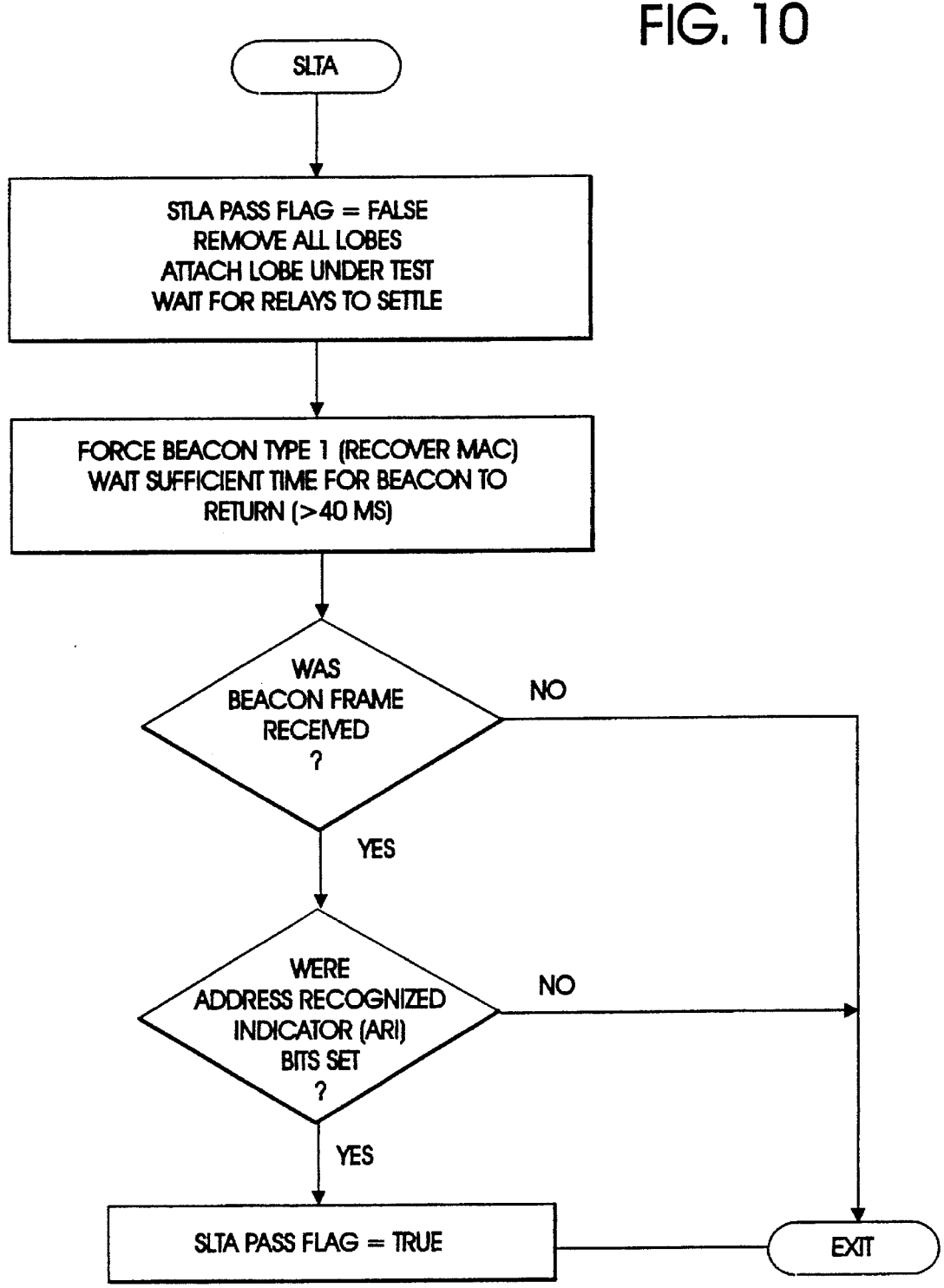
Figure 11:
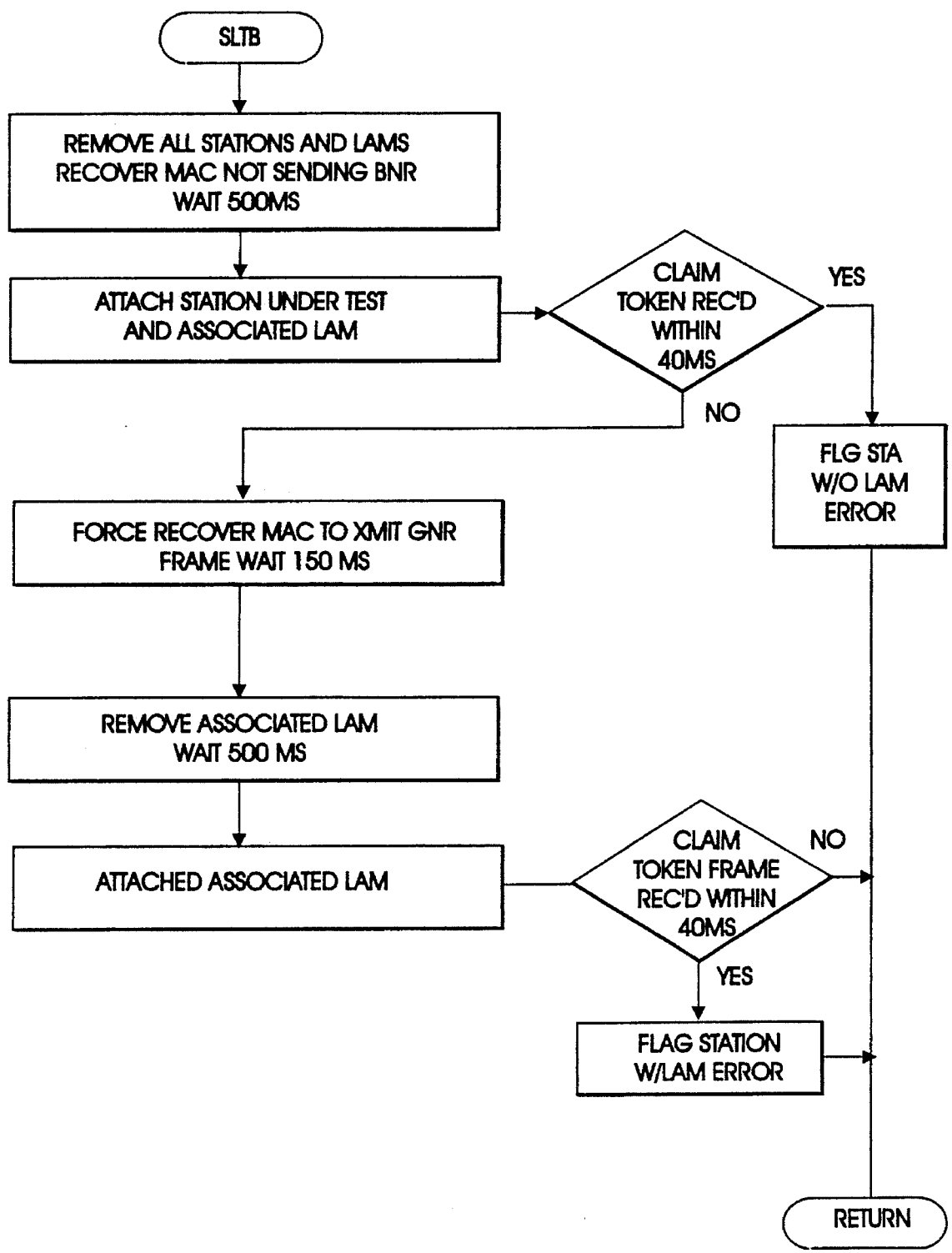
Figure 12:
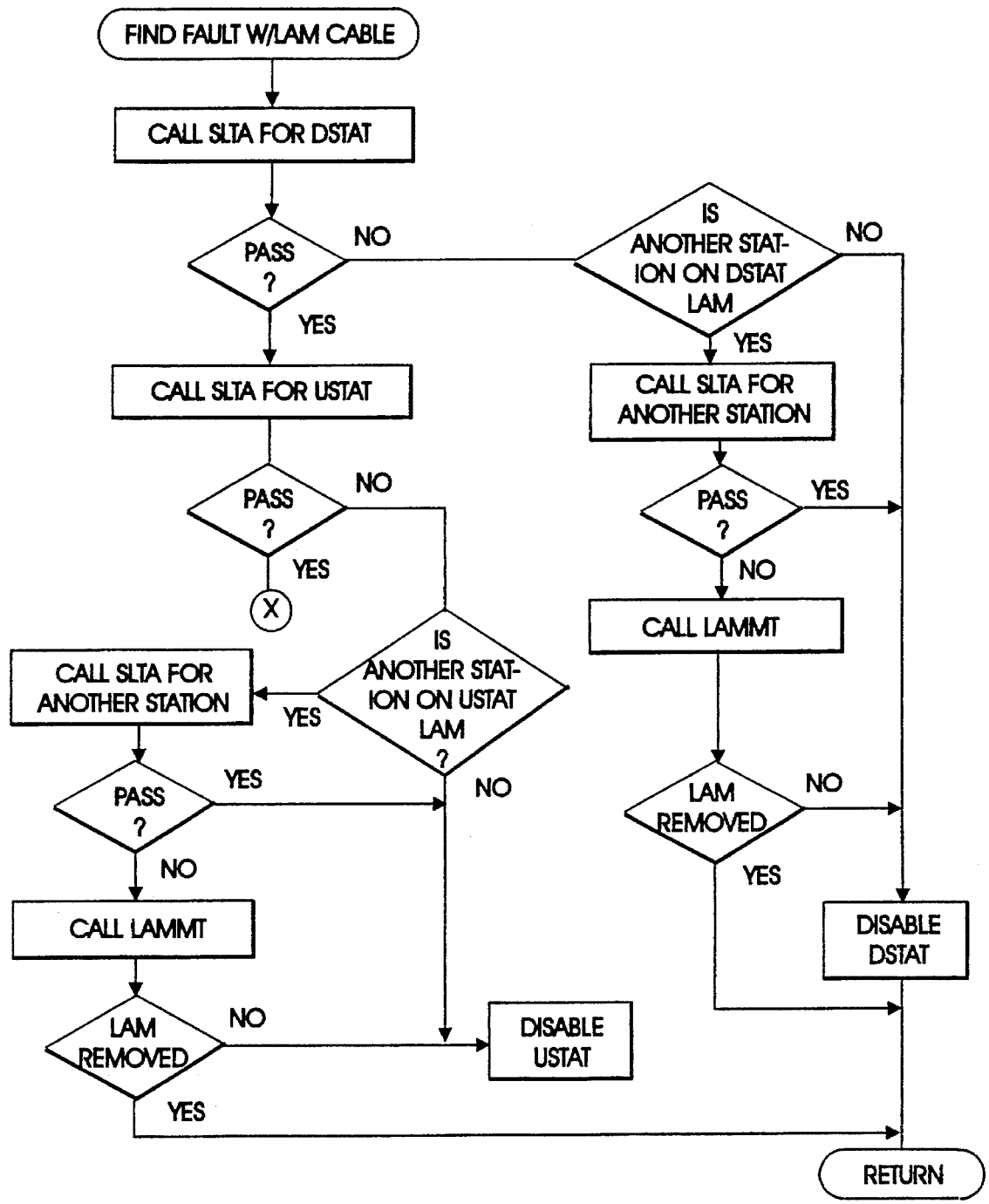
Figure 13:
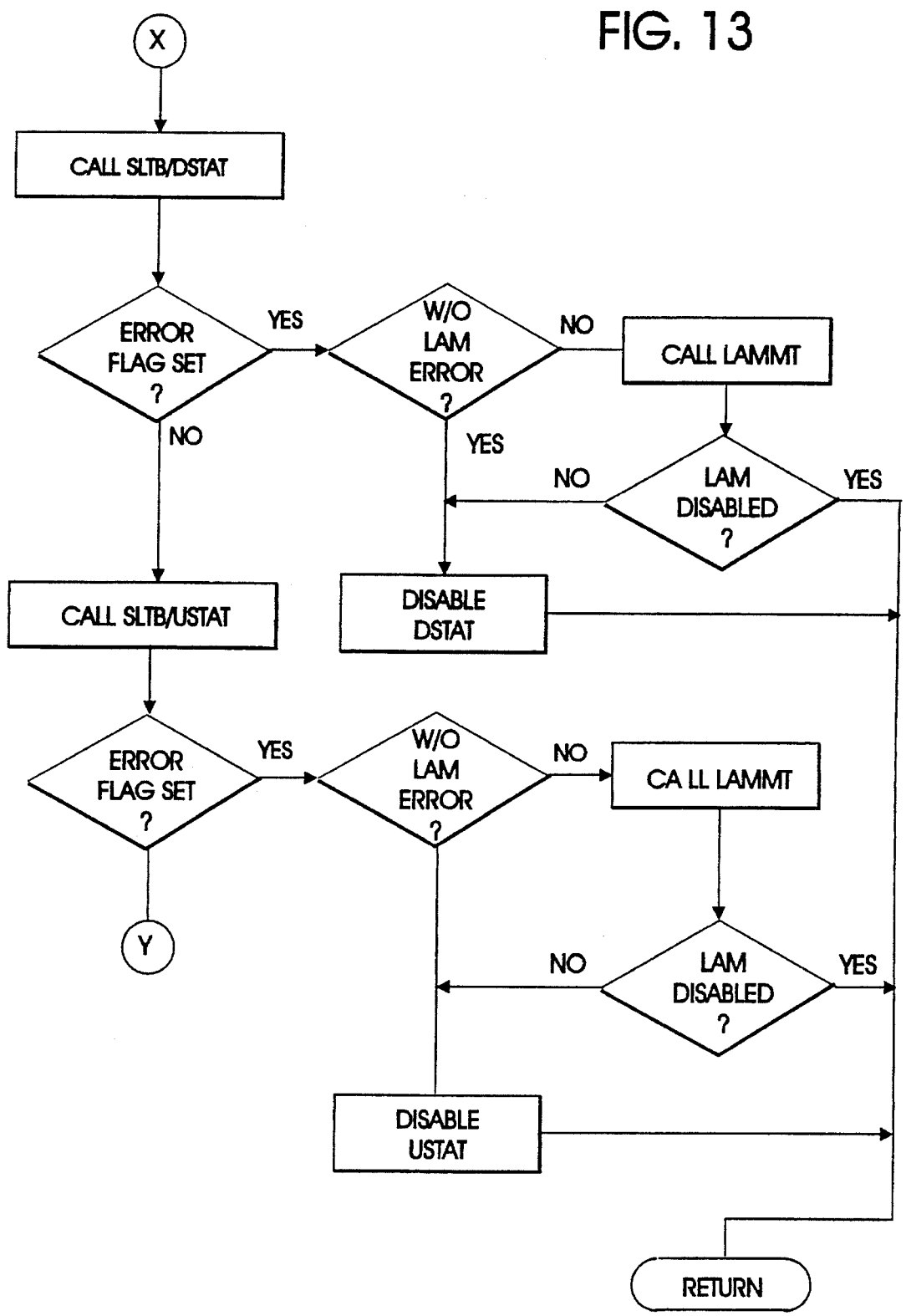

If the Fault Found Flag is True, the program selects one of two program modules depending on the location of the fault domain. When the fault domain includes ports connected to different lobe attachment modules (LAM) 13 the program calls Find Fault With Lobe Attachment Cable (FIGS. 12, 13 and 14). If both ports are connected to the same LAM it calls Find Fault W/O Lobe Attachment Cable (FIGS. 8 and 9). In each case the program returns as described above when the called module completes execution.

The LAMMT module (FIG. 7) is used when all of the stations have been removed. It checks the LfiAMs 13 and the interconnecting cables by sending 512 frames and receiving at least 511 good frames from and to the adapter 16. If tbAs test is successful it exits. If not, all of the LAMs are removed and the test repeated. If this test fails an internal error flag is set and the program exits. If this test passes then the LAMs 13 are added one at a time and individually tested. If a LAM fails it is flagged as bad and the program exits. If all LAMs are tested and none fail the program exits.

Find Fault W/O LAM Cable (FIGS. 8 and 9) is used when the fault domain has been found and both stations are connected to ports on the same LAM. This module subjects the DSTAT and the USTAT to the SLTA and SLTB tests. If a station fails, the station is disabled and the program returns. If the DSTAT and the USTAT individually pass both tests they are both reconnected and a beacon type 1 frame is forced at the adapter 16. If this frame is not received both stations and their ports are disabled. When the type 1 frame is received the program returns.

Find Fault W/ LAM Cable (FIGS. 12, 13 and 14) is used when the fault domain includes stations attached to ports on different LAMs. This module calls SLTA for testing the DSTAT and the USTAT. If both pass it calls SLTB for testing the DSTAT and the USTAT (FIG. 13). Again if both pass, the two stations are attached (FIG. 14) and a BNR from adapter 16 is forced. If the BNR is received at adapter 16 the test returns. If the BNR is not received LAMMT is called. If this test does not remove a LAM both the DSTAT and the USTAT are removed.

When one of the stations does not pass the SLTA test the program looks to see if another station is on the same LAM as the failed station. It selects one and repeats the SLTA test for the selected station. If this passes, the DSTAT or USTAT, as the case may be, is disabled. If the SLTA for the other station fails, the program calls LAMMT and check to see if this results in removal of the LAM. If the LAM is not removed, the DSTAT or USTAT is disabled. If the LAM is removed the program returns. The testing of one other station is a confirmation test.

When one of the stations fails the SLTB test one of two error flags is set (W/O LAM or W/LAM). If the W/O LAM flag is set the station under test is disabled and then returns. If the W/ LAM flag is set, it calls LAMMT. If LAMMT does not disable a LAM, the DSTAT or USTAT as the case may be, is disabled and the program returns. If LAMMT disables a LAM the program returns.

The SLTA test (FIG. 10) is extremely useful in detecting stations connected to the ring which are able to participate in some aspects of the total ring protocol, however, introduce errors which are difficult to detect. This situation is often encountered when stations are configured improperly or designed to operate at different data rates and tend to disappear when the station is isolated for individual testing and required to only repeat signals. In the SLTA test the lobe and its LAM are connected to the adapter 16 which transmits a BNR frame. This frame uses a broadcast address and has an address recognized indicator which is set by the first station which receives the frame. Since there is only one station in the ring at this time, a frame returned with an unset address recognized indicator signals an error condition. The pass flag is only set when the frame returns with the address recognized indicator set.

The SLTB test (FIG. 11) is used to test individual stations under conditions which approximate those which exist when the station is connected to a down stream station without that connection in place. It can be conducted with or without the LAM (i.e., station only). The test is started by removing all stations and LAMs, discontinue transmitting the BNR and waiting 500 ms. After the wait, the station and the associated LAM are reconnected. If a claim token frame is received at the adapter 16 within 40 ms a W/O LAM error flag is set and the program returns.

When a claim token frame is not received within 40 ms adapter 16 send a BNR followed by a walt of 150 ms. This acts as a reset. Then the LAM is removed and a 500 ms walt takes place before the LAM is attached. If a claim token frame is received at adapter 16 within 40 ms the W/LAM error flag is set. The program returns after the flag is set or if a claim token frame was not received within the 40 ms time period.

While only a single embodiment of the invention has been described in detail it will be obvious to those skilled in the art that changes may be made in the implementation of the invention without departing from the spirit and scope of the invention and the scope and coverage of the invention shall be measured by the claims.

We claim:

1. In a unidirectional token ring network having a transmission media, a plurality of multiport reconfigurable access units coupled to the transmission media and a plurality of stations connected to each one of the plurality of multiport reconfigurable access units, a method for diagnosing said unidirectional token ring network to determine faulty components comprising:

configuring at least one of the multiport access units so that the unidirectional token ring is partitioned into a first unidirectional token ring network and an isolated unidirectional token ring network; said isolated unidirectional token ring network including a communication adapter coupled to a plurality of switch means, a programmed microprocessor coupled to the switch means and the adapter and selected ones of the plurality of stations coupled to selected ones of the plurality of switch means;

transmitting a unique message frame from said adapter to the selected ones of the plurality of stations;

disconnecting, by means of the microprocessor and selected switch means, one station at a time from the isolated unidirectional token ring network beginning with a station immediately upstream from said adapter and terminating disconnection step upon receipt at said adapter said unique message frame;

using the programmed microprocessor and tables internal to said programmed microprocessor to identify a fault domain which includes a last station, called the downstream station, removed before receiving said unique frame at the adapter and a station immediately upstream, called the upstream station, from the downstream station;

disconnecting all stations from the network;

reconnecting the downstream station;

testing the downstream station, if the downstream station fails, disabling the downstream station;

if the downstream station passes disconnecting the downstream station and reconnecting the upstream station;

testing the upstream station, if the upstream station fails, disabling the upstream station;

if the upstream station passes reconnecting both the downstream station and upstream station; and testing the upstream and downstream stations, if the upstream and downstream stations fails, disable both.

2. A method as set forth in claim 1 in which the unique message frame is modified by the first station which receives the unique message frame.

3. A method as set forth in claim 2 in which the unique message frame is a type 1 beacon frame with a broadcast address and an address recognized indicator bit which is set to a first state by the first station receiving the type 1 beacon frame.

4. A method as set forth in claim 1 in which the station under test has the station under test output connected to the station under test input by operating a station attachment switch for a predetermined time and then reconnect the station under test to the communication adapter;

examining with the programmed microprocessor, signals received from the reconnected station; and using the programmed microprocessor to disable predetermined signals are received within a predetermined time after reconnection.

5. A method as set forth in claim 1 in which the stations are first individually tested by sending a frame which is modified by the first station to receive the frame; and if the frame is modified, the stations are individually tested by disconnecting the station under test from the network, connecting the station output to the station input for a predetermined time period and reconnecting the station and examining by the programmed microprocessor the signals generated and forwarded from the reconnected station to determine if the station is providing invalid signals.

6. A method as set forth in claim 5 in which the frame which is to be modified by the first station to receive said frame, is a beacon reconfiguration BNR frame with a broadcast address and the first station to receive the frame sets an addressed recognized indicator.

7. A method as set forth in claim 5 in which the signals from a reconnected station are examined for invalidity for a predetermined period of time after the station is reconnected.

8. A method as set forth in claim 7 in which a claim token frame if received from a station within the predetermined time period following reconnection of the station the claim token frame is invalid and the station under test is disabled.

* * * * *